Feb. 6, 1962     P. FREEMAN     3,019,582

LAMINATED BLISTER PACKAGE SEALING MACHINE

Filed April 13, 1960     2 Sheets-Sheet 1

INVENTOR.
PHILIP FREEMAN
BY
Sanford Schnurmacher
ATTORNEY.

Feb. 6, 1962 P. FREEMAN 3,019,582
LAMINATED BLISTER PACKAGE SEALING MACHINE
Filed April 13, 1960 2 Sheets-Sheet 2

INVENTOR.
PHILIP FREEMAN
BY
Sanford Schumacher
ATTORNEY.

United States Patent Office 3,019,582
Patented Feb. 6, 1962

3,019,582
LAMINATED BLISTER PACKAGE
SEALING MACHINE
Philip Freeman, 1391 E. 33rd St., Cleveland, Ohio
Filed Apr. 13, 1960, Ser. No. 21,947
2 Claims. (Cl. 53—371)

This invention relates to packaging machines and particularly to a machine for sealing laminated blister packages.

Conducive to a better understanding of this invention it may be well to point out that the display packaging of collapsible tubes containing plastic materials in the form of pastes, creams, jellies, and the like, is very difficult.

Due to the deformable nature of such tubes under pressure, the usual methods of attaching merchandise to display cards by means of staples, rivets or glue, is impractical.

Your applicant has developed the use of a rigid, so-called clear plastic blister, as explained in his co-pending U.S. application, Serial No. 698,543, now abandoned. The blister is shaped to conform to the outline of the tube, and is open to the rear so that the tube can be easily dropped therein. The open rear of the bulbous portion of the blister is bounded by a laterally extending flange.

The tube containing blister is mounted between two display cards by means of a suitable adhesive, with the bulbous portion of the blister extending through a die cut opening in the front card, the blister flange being positioned between the two cards to form a laminated sandwich, that provides an attractive unitary package.

The major problem encountered in fabricating such a package is the application of uniform pressure to the two adhesive covered surfaces for a pre-determined time so that each package will be properly sealed regardless of any irregularities in the opposed surfaces. This is further complicated by the fact that no pressure may be applied to the bulbous portion of the blister during the sealing operation.

The primary object of this invention, therefore, is to provide a machine that will automatically subject an adhesive coated laminated blister package to compressive pressure for a predetermined period to effect permanent adhesion of the several elements.

Another object is to provide a device of the type stated that has a rotating package supporting drum that automatically indexes successive packages into processing position and then tilts the completed packages off the drum into a storage bin or on to a conveyor belt.

A further object is to provide such a machine with a hollow indexing, work holding, drum, having a cavity in the surface thereof in which the dependent blister of the package is nested during the pressing cycle.

Further objects are to provide a machine of the type described that is reliable in operation, relatively inexpensive in cost, and compact and rugged in structure.

These and other objects of the invention will become apparent from a reading of the following specification and claims, together with the accompanying drawings, wherein:

Figure 6:
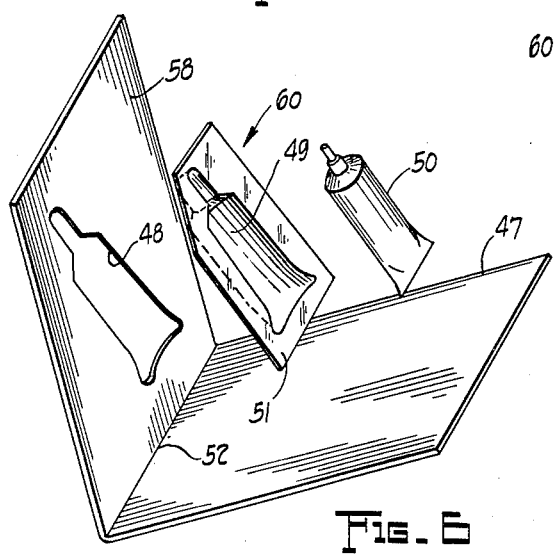
FIGURE 6 is an exploded view of the laminated blister package that is sealed by this machine.
Figure 7:
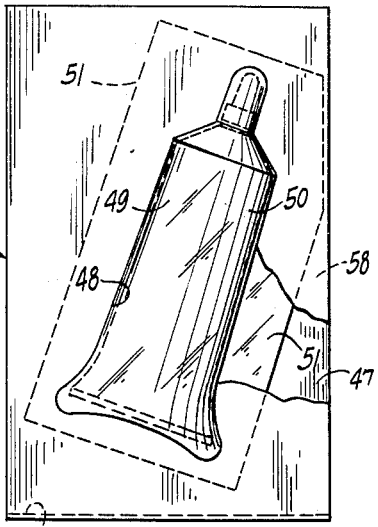
FIGURE 7 is a top plan view of the sealed package with portions broken away to reveal the relation of the various elements.

Referring more particularly to the drawings, there is seen in FIGURES 6 and 7 the laminated blister package, broadly indicated by reference numeral 60, that the machine that is the subject of this invention is intended to seal.

The package 60 comprises a card folded upon itself, at 52, to provide a top section 58 and a bottom section 47. The top section 58 has an opening 48, shaped to receive the bulbous portion of the flanged blister 49 therethrough, at the flange 51. The merchandise tube 50 is nested in the blister 49 and the bottom section 47 is folded against the blister flange 51 and the top section 58, as is seen most clearly in FIGURE 7. The bottom and top sections, 47 and 48, respectively, are sealed together by means of a cold quick-tack adhesive which requires only a few seconds under pressure to effect permanent lamination of the package. The complete package 60 affords a clear view, through the protective blister 49, of the merchandise tube 50 with ample space around the blister for promotional advertising on both the front and rear faces of the card.

Figure 1:
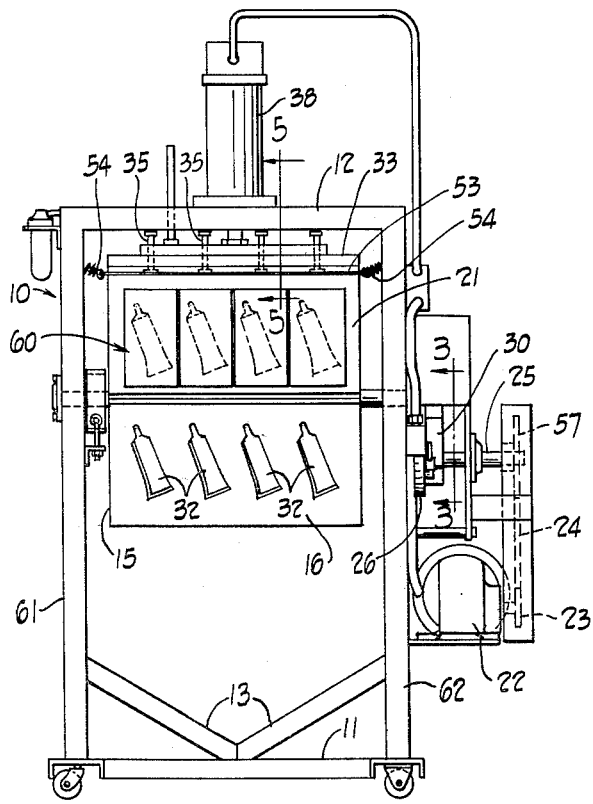
FIGURE 1 is a front elevation of the laminated blister package sealing machine that is the subject of this invention.
Figure 2:
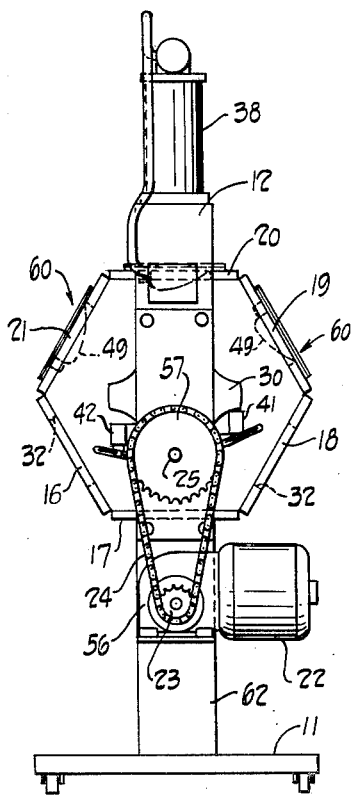
FIGURE 2 is a right end view of the same.

Again referring to the drawings, there is seen in FIGURES 1 and 2 the automatic package sealing machine that is the subject of this invention.

The machine comprises a sturdy frame member 10, preferably fabricated from channel iron sections welded together to define a base 11 and two spaced uprights 61 and 62 joined through a top section 12 to form an erect rectangle.

Reference numeral 13 indicates frame stiffening braces.

A drum axle 14 is journaled between the frame uprights 61 and 62 and serves as the center of rotation of a hexagonal hollow drum 15 mounted thereon. The drum 15 has six plane faces, angled at 60° to each other, and identified by reference numerals 16, 17, 18, 19, 20 and 21, respectively.

Figure 5:
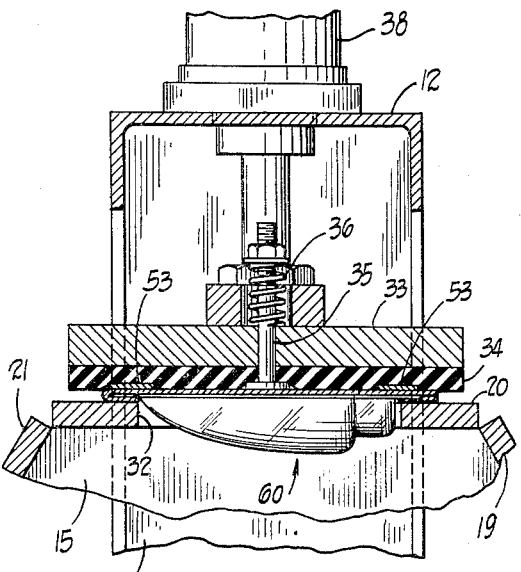
FIGURE 5 is a vertical sectional view taken along the line and in the direction of the arrows 5—5 of FIGURE 1.

Each drum face has four cavities 32 cut therethrough, of a shape to permit the package blister 41 to depend therethrough, with clearance all around, as is seen most clearly in FIGURE 5.

It is to be understood that the number of cavities 32 is determined by the size of the packages 60 and the width of the drum 15. It so happens that in the case of the machine illustrated, the size of the drum and packages permits the placement of four packages, side by side, on each plane face of the drum 15.

Reference numeral 38 indicates a pneumatic cylinder mounted vertically on the frame top section 12 with its reciprocating piston rod 37 extending therethrough, in alignment with the center of the drum axle 14.

A platen plate 33 of a shape and size matching that of each of the six drum faces 16—21, inclusive, is mounted on the lower end of the piston rod 37. The platen has a resilient pad 34 covering the face thereof.

The platen 33 can be made to reciprocate vertically into and out of engagement with the drum 15 by suitable activation of the pneumatic cylinder 38.

Reference numeral 35 indicates four push-off plungers mounted through the platen 33 and raised by a spring 36 to be normally flush with the face of the platen cushion 34, as seen most clearly in FIGURE 5. The length of each plunger is such that its upper end will hit the under side of the frame top 12 when the platen is moved to its raised position, thereby causing each plunger to extend below the face of the platen plate and push off any package that may adhere to the bottom face thereof.

A second package release element 53, comprising two parallel metal straps, is suspended on springs 54 and 55 cross-wise of the frame between the platen and drum, and acts to strip off any packages that may adhere to the platen as it retracts upward.

Reference numeral 30 indicates a six point Geneva wheel mounted on the end of the drum axle 14. The wheel 30 has six radial slots 31, spaced 60° apart, with six concave peripheral segments 29 postioned between the slots.

A counter-shaft 25 is journaled on a sub-frame below the driven wheel 30 and carries a driver wheel 26 having a cam roller 28 engageable with successive Geneva wheel slots 31, upon each revolution, as is well understood by those familiar with such intermittent motion devices. The driver wheel 26 has a segment 27 whose concentric sufrace engages the concave surfaces 29 between each pair of slots 31 before the cam driving roller 28 is disengaged from the driver wheel 30, which prevents the latter from rotating while the roller 28 is moved around to engage the next successive slot. Reference numeral 57 indicates a sprocket wheel mounted on the end of the counter shaft 25 and connected through a chain transmission 24 to the sprocket wheel 23 of the electric motor 22. The motor 22 has a built-in speed reducing gear box 56 which reduces the speed of the sprocket wheel 23 to 36 r.p.m. and this is in turn reduced by the 13/31 ratio between the sprockets 23 and 57 to approximately 16 r.p.m. for the cam driver shaft 25.

Reference numerals 41 and 42 indicate electric switches which have their triggering elements positioned in the path of rotation of the cam roller 28 for a purpose to be hereinafter disclosed.

Figure 4:
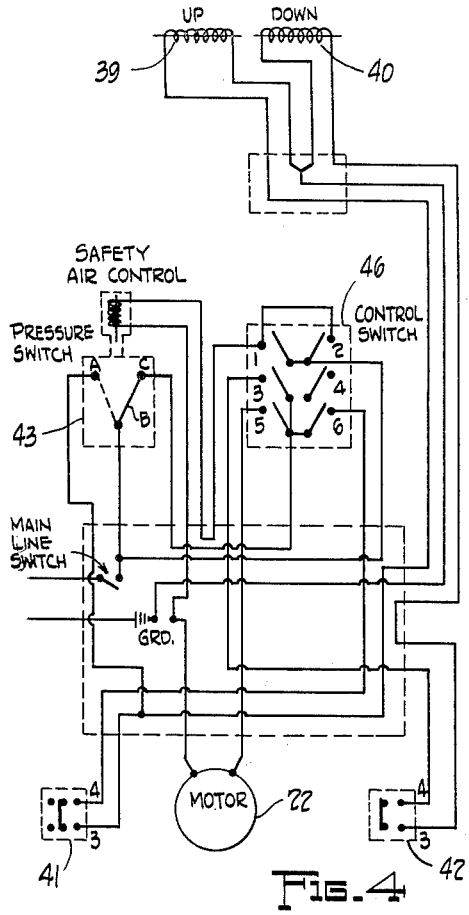
FIGURE 4 is a schematic view of the electric circuits which automatically control the alternate indexing and pressure cycles.

Referring to FIGURE 4, there is seen the electrical layout which controls the proper sequential action of the platen plate 33.

Reference numerals 39 and 40 indicate the electric air valve controls of the pneumatic cylinder 38. When the element 39 is energized, the piston rod and platen 33 rise vertically and away from the drum 15. When the element 40 is energized, the platen moves downward into pressed contact with the drum 15. Electric valves 39 and 40 are connected through suitable circuits to control switches 41 and 42, respectively. In order to protect the machine against damage a conventional safety air pressure switch 43 is located ahead of the regular control switch 46, for the motor and air cylinder valves. When the main line switch is closed and the pressure in the pneumatic system is below the safe operating level, the switch arm B rests on contact A, as indicated by a dotted line. This completes the circuit to "Up" valve 39, which permits whatever air pressure there is in the system to act to lift the platen to its "up" position. Under these conditions the motor and "down" valve circuits remain open even through the control switch should be closed. At proper pressure the arm B swings into engagement with contact C to activate all the circuits.

Figure 3:
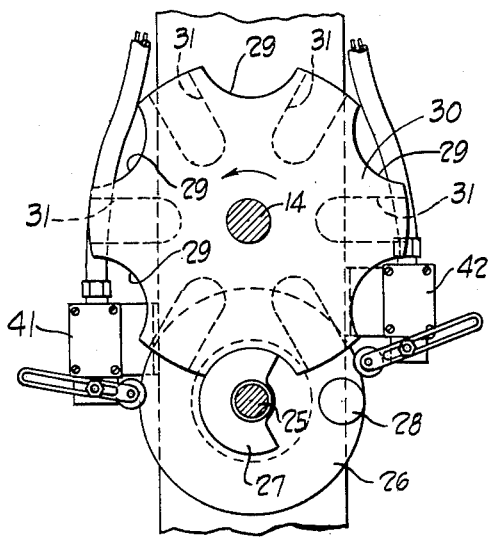
FIGURE 3 is an enlarged view, partly in section, of the geneva wheel and cam follower, taken along the line and in the direction of the arrows 3—3 of FIGURE 1.

The operation of the machine is as follows:

The closing of the control switch 46 starts the motor 22. In the form of the machine illustrated in FIGURE 3, the driver wheel 26 rotates in a clockwise direction. Just before the cam roller 28 is about to enter the Geneva wheel slot 31, it passes by and triggers the "up" switch 41 thus closing the circuit of the "up" valve 39. This in turn energizes the pneumatic cylinder to move the platen plate 33 upward and clear of the drum 15. The cam roller then engages the Geneva wheel slot 31, and as it continues along its circular path it rotates the drum ⅙ of a turn to bring a succeeding plane surface of the drum into parallel alignment with the lower face of the platen plate. As the roller 28 leaves its engaged slot 31, it passes by and triggers the "down" switch 42 thus closing the circuit of the "down" valve 40. This in turn energizes the pneumatic cylinder to move the platen plate downward into pressed contact with the drum, as seen in FIGURES 1, 2 and 5.

The platen is held pressed against the drum until the cam roller 28 again triggers the "up" switch 41. With a rotation of 16 r.p.m. for the shaft 25, this "dwell" period is about 3 seconds which is ample for a quick-set adhesive. It is of course to be understood that the "dwell" period can be varied by changing the gear ratio of the driving system.

The cycle is then repeated endlessly, with the built-in-safety features assuring that the platen 33 will always be above and clear of the drum 15 before it can start to rotate.

With the machine illustrated, four packages can be processed at one time. Referring to FIGURES 1 and 2, it will be seen that four packages 60 spread with adhesive are placed on the plane face 19 of the drum 15, with the blister nested within the cavities 32.

The platen is automatically raised, the drum indexes as described hereinbefore to bring face 19 into parallel alignment with the platen 33. Platen 33 then descends and is pressed against the drum 15 and the package 60, sandwiched therebetween as seen in FIGURE 5. It will be noted that only that part of the package beyond the cavity opening 32 is subjected to squeezing pressure, thereby protecting the contained merchandise.

At the end of the cycle the drum is again indexed, bringing a new set of packages under the platen and moving the processed set to a first position beyond the platen, indicated by reference numeral 21 in FIGURE 2. When the drum indexes to bring the completed packages to the position occupied by face 16 of FIGURE 2, they will fall off of their own weight into a container or on to a conveyor belt, not illustrated.

By studying FIGURE 5, it will be evident that if any of the packages 60 stick to the under face 34 of the platen 33 they will be pulled off by the straps 53 or knocked off by the plungers 36 which will be pushed below the surface 34 when their upper ends hit the top channel 12 as the platen plate moves upward. The machine only requires to be loaded. Once placed upon the drum the packages are automatically sealed and discharged into a waiting container.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:
1. A laminated blister package sealing machine, comprising in combination, a frame member, a vertically reciprocating platen actuated by a pneumatic cylinder including electrically operated valve means and associated circuits, a horizontally extending hexagonal drum journaled on the frame immediately below the platen, each of the plane faces of the drum having a cavity therein bounded by a flat surface, adapted to support a laminated blister card thereon with the blister in dependent position within the cavity, a motor mounted on the frame, a six point Geneva wheel mounted on the drum axle and connected to the motor through a driver having a cam roller intermittently engageable therewith, to index successive faces of the drum into parallel alignment with the platen, and first and second electric switches forming a part of the pneumatic valve circuits and mounted in the path of the rotating cam roller, the first switch being triggered by the cam roller immediately prior to its engagement with the Geneva wheel slots to energize the pneumatic cylinder and raise the platen clear of the drum, the second switch being triggered by the cam roller immediately after its disengagement from the Geneva wheel to energize the pneumatic cylinder and lower the platen into compressed engagement with the aligned drum surface.

2. A package sealing machine of the type described in claim 1, and further distinguished by the platen having a plurality of linearly spaced vertical push-off plungers mounted therethrough of a length such that they will not touch the frame above the platen when the platen when the platen is in its lowered position; the plungers being normally spring biased to a first position, wherein their heads are raised and flush with the plane of the underside of the platen, the plungers being moved to their second, lowered position, wherein their upper ends contact the frame and their heads are below the plane of the platen, when the platen is in its raised position, whereby any packages adhering to the bottom of the platen are pushed off.

References Cited in the file of this patent

UNITED STATES PATENTS

| | | |
|---|---|---|
| 2,549,123 | Osterhof | Apr. 17, 1951 |
| 2,712,208 | Campbell | July 5, 1955 |

OTHER REFERENCES

Modern Packaging publication, September 1959 issue, pp. 130–134.